(12) United States Patent
Williams

(10) Patent No.: US 12,142,089 B2
(45) Date of Patent: Nov. 12, 2024

(54) PASS-THROUGH OBD-II DIAGNOSTIC INTERFACE

(71) Applicant: K&N Engineering, Inc., Riverside, CA (US)

(72) Inventor: Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 494 days.

(21) Appl. No.: 16/924,552

(22) Filed: Jul. 9, 2020

(65) Prior Publication Data
US 2022/0012956 A1 Jan. 13, 2022

(51) Int. Cl.
*G07C 5/00* (2006.01)
*G07C 5/08* (2006.01)
*H04L 12/40* (2006.01)

(52) U.S. Cl.
CPC ........... *G07C 5/008* (2013.01); *G07C 5/0808* (2013.01); *H04L 12/40* (2013.01); *H04L 2012/40273* (2013.01)

(58) Field of Classification Search
CPC ....... G07C 5/008; G07C 5/0808; H04L 12/40; H04L 2012/40273
See application file for complete search history.

(56) References Cited

U.S. PATENT DOCUMENTS

| | | | |
|---|---|---|---|
| 2017/0058811 A1* | 3/2017 | Misson | F02P 5/1502 |
| 2017/0240126 A1* | 8/2017 | Kang | B60R 16/03 |
| 2017/0337573 A1* | 11/2017 | Toprak | G06Q 30/0278 |

* cited by examiner

*Primary Examiner* — Sizo B Vilakazi
(74) *Attorney, Agent, or Firm* — Rutan & Tucker LLP; Hani Z. Sayed

(57) ABSTRACT

An apparatus and methods are provided for a pass-through dongle for accessing and interacting with vehicle performance and status data. The dongle includes a first connector for plugging into an OBD-II connector of a vehicle. A wireless connection may be established between the dongle and a mobile device that provides access to and interactivity with the vehicle performance and status data. A second connector comprising the dongle is configured to receive an auxiliary device that is configured to access vehicle status data by way of the OBD-II connection. The dongle simultaneously establishes the wireless connection with the mobile device and provides the auxiliary device with access to the vehicle performance and status data. In some embodiments, the dongle is configured to operate in conjunction with a vehicle diagnostic communication system that includes a vehicle performance system whereby the vehicle performance and status data may be interactively accessed.

19 Claims, 3 Drawing Sheets

PASS-THROUGH OBD-II DIAGNOSTIC INTERFACE

FIELD

Embodiments of the present disclosure generally relate to the field of vehicle diagnostics. More specifically, embodiments of the disclosure relate to systems and methods for a pass-through OBD-II diagnostic interface configured to present OBD-II data monitoring and interactivity while providing access to auxiliary OBD-II compatible devices.

BACKGROUND

The Environmental Protection Agency (EPA) has required vehicle manufacturers to install on-board diagnostics (OBD) for emission control on automobiles and light-duty trucks since model year 1996. On-board diagnostic systems, such as computers, microcontrollers, and sensors, monitor emission control systems of a vehicle to detect any malfunction or deterioration that causes emissions to exceed EPA-mandated thresholds. An OBD system typically includes, for example, an oxygen sensor located in the exhaust manifold of the vehicle.

The EPA requires that all information monitored or calculated by OBD systems is made available through a standardized, serial 16-cavity connector referred to as an Assembly Line Diagnostic Link (ALDL) or an OBD connector. For vehicles made after 1996, the 16-cavity connector is referred to as an OBD-II connector. Further, when emission thresholds are exceeded, diagnostic information characterized by OBD systems must be stored in a central computer of the vehicle for use during diagnosis and repair.

A second generation of OBD systems, referred to as "OBD-II" systems, monitors a wide range of data that indicate the performance of the host vehicle, including, for example emissions performance, vehicle speed, mileage, engine temperature, intake manifold pressure, and the like. In some instances, OBD-II systems also store manufacturer-specific data, such as data relating to the vehicle's engine, transmission, brakes, alarm, entertainment systems, and the like. Typically, OBD-II systems monitor codes referred to as diagnostic trouble codes (DTCs) that are capable of indicating mechanical and electrical problems with the vehicle.

Moreover, modern vehicles typically have electronic control units (ECUs) that are configured to control internal electromechanical actuators, such as, for example, fuel-injector pulses, spark-plug timing, anti-lock braking systems, and the like. Most ECUs transmit status and diagnostic information over a shared, standardized electronic buss in the vehicle. The buss serves as an on-board computer network with many processors that transmit and receive data. The primary computers in this on-board computer network are an electronic-control module (ECM) and a power-control module (PCM). The ECM typically accesses computers and microcontrollers that monitor and control engine functions, such as a cruise-control module, a spark controller, an exhaust/gas recirculation system, and the like. The PCM often controls and monitors ECUs associated with the power train, such as, for example, the engine, transmission, and braking systems.

During vehicle servicing, data from the standardized buss can be accessed by way of external engine-diagnostic equipment, commonly referred to as "scan tools," that connect to the above-mentioned OBD-II connector, typically located under the vehicle's dashboard on the driver's side. Data transferred through the connector to the scan tool generally identify a status of the vehicle and whether or not a specific component of the vehicle has malfunctioned. Many modern scan tools are capable of wireless communication and thus are capable of uploading data to an external computer, such as a desktop, a tablet, a server, a mobile phone, a personal digital assistant (PDA), a personal communicator, a network router or hub, a wireless access point (AP) or repeater, and the like. As will be appreciated, using a scan tool makes vehicle servicing more efficient and cost-effective.

SUMMARY

An apparatus and methods are provided for a pass-through dongle for accessing and interacting with vehicle performance and status data. The dongle includes a first connector for plugging into an OBD-II connector of a vehicle to access the vehicle performance and status data. A wireless connection may be established between the dongle and a mobile device that provides access to and interactivity with the vehicle performance and status data. A second connector comprising the dongle is configured to receive an auxiliary device. The auxiliary device may comprise any device configured to access vehicle status data by way of the OBD-II connection. The dongle may be configured to simultaneously establish the wireless connection with the mobile device and provide the auxiliary device with access to the vehicle performance and status data. In some embodiments, the dongle is configured to operate in conjunction with a vehicle diagnostic communication system that includes a vehicle performance system. The vehicle performance system may comprise a mobile device application operating on a mobile device whereby the vehicle performance and status data may be interactively accessed.

In an exemplary embodiment, a dongle for connecting to an OBD-II connector of a vehicle comprises: a female connector for plugging into the OBD-II connector; a male connector for receiving an auxiliary device; circuitry for accessing vehicle status data; and a rigid body for housing the circuitry.

In another exemplary embodiment, the female connector includes a multiplicity of male pins suitable for being plugged into the OBD-II connector of the vehicle. In another exemplary embodiment, the multiplicity of male pins comprise 16 pins that are arranged to be inserted into a female OBD-II connector of the vehicle. In another exemplary embodiment, the multiplicity of male pins are in electrical communication with the circuitry such that vehicle status data may be transmitted from the OBD-II connector of the vehicle to the circuitry.

In another exemplary embodiment, the male connector includes a multiplicity of female connectors suitable for receiving pins comprising any of various devices that are compatible with the OBD-II connector of the vehicle. In another exemplary embodiment, the multiplicity of female connectors comprise 16 connectors that are arranged similarly to a multiplicity of male pins comprising the female connector. In another exemplary embodiment, the multiplicity of female connectors are in electrical communication with the circuitry such that electrical signals may be transmitted from the circuitry to the auxiliary device.

In another exemplary embodiment, the dongle is configured to be plugged into the OBD-II connector to access vehicle status data and pass the vehicle status data to the auxiliary device by way of the male connector. In another exemplary embodiment, the dongle is configured to provide the auxiliary device with access to the vehicle status data. In another exemplary embodiment, the dongle is configured to wirelessly transmit the vehicle status data to a device or system that is configured to read and display the vehicle status data to an end-user of the dongle.

In another exemplary embodiment, the dongle is configured to operate in conjunction with a vehicle diagnostic communication system that includes a vehicle performance system. In another exemplary embodiment, the vehicle performance system comprises a mobile device application operating on a mobile device. In another exemplary embodiment, the dongle is configured to plug into the OBD-II connector and establish a wireless connection with the mobile device whereby the vehicle performance system provides access and interactivity to vehicle performance and status data. In another exemplary embodiment, the dongle is configured to provide the auxiliary device with access to the vehicle performance and status data. In another exemplary embodiment, the auxiliary device comprises any device configured to access vehicle status data by way of an OBD-II connection. In another exemplary embodiment, the dongle is configured to simultaneously establish the wireless connection with the mobile device and provide the auxiliary device with access to the vehicle performance and status data.

In an exemplary embodiment, a method for accessing vehicle status data comprises: plugging a first connector of a pass-through dongle into an OBD-II connector of a vehicle; establishing a wireless connection between the pass-through dongle and a mobile device; and plugging a second connector of the pass-through dongle into an auxiliary device.

In another exemplary embodiment, establishing the wireless connection includes accessing and interacting with the vehicle status data by way of the mobile device. In another exemplary embodiment, plugging the second connector includes accessing the vehicle status data by way of the auxiliary device.

In an exemplary embodiment, a method for a dongle for accessing vehicle status data comprises: configuring circuitry to receive the vehicle status data; housing the circuitry within a rigid body having a first connector and a second connector; adapting the first connector to plug into an OBD-II connector of a vehicle; configuring the second connector to plug into an auxiliary device; and coupling the circuitry with the first connector and the second connector.

In another exemplary embodiment, configuring the circuitry includes configuring the circuitry to operate in conjunction with a vehicle diagnostic communication system that includes a vehicle performance system. In another exemplary embodiment, configuring the circuitry includes configuring the circuitry to establish a wireless connection with a mobile device that provides access to and interactivity with the vehicle performance and status data. In another exemplary embodiment, configuring the second connector includes configuring the circuitry to provide the auxiliary device with access to the vehicle status data. In another exemplary embodiment, coupling the circuitry includes configuring the circuitry to simultaneously establish the wireless connection with the mobile device and provide the auxiliary device with access to the vehicle status data.

BRIEF DESCRIPTION OF THE DRAWINGS

The drawings refer to embodiments of the present disclosure in which.

Figure 1:
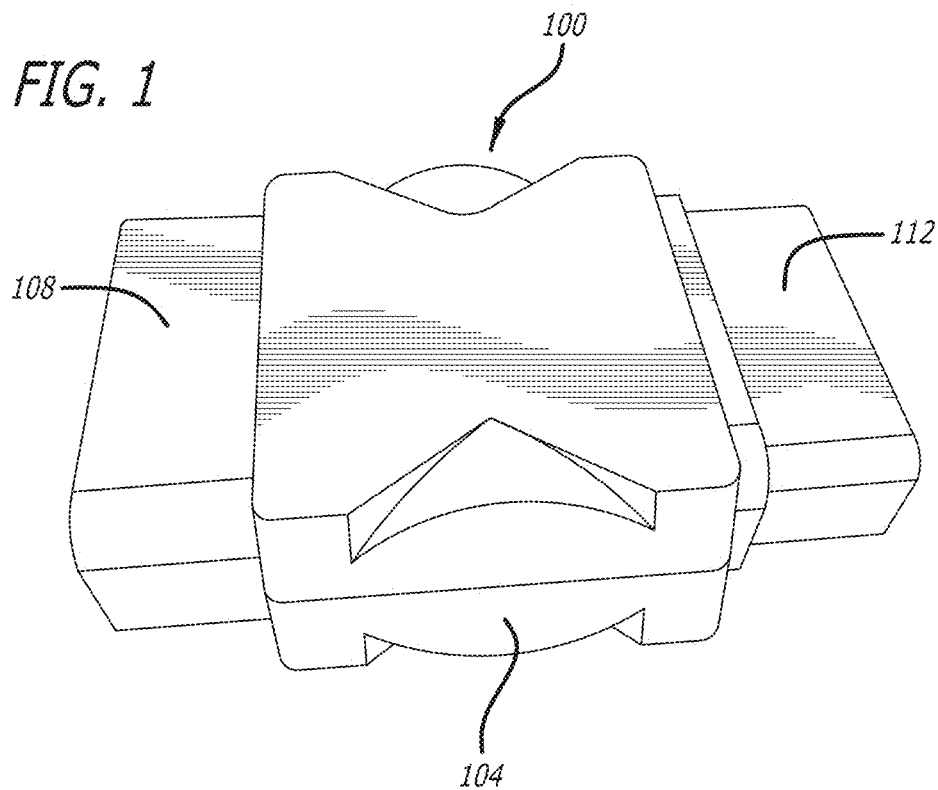
FIG. 1 illustrates an exemplary embodiment of a pass-through dongle that is configured to be connected to the OBD-II connector of a vehicle.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first vehicle," may be made. However, the specific numeric reference should not be interpreted as a literal sequential order but rather interpreted that the "first vehicle" is different than a "second vehicle." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the Environmental Protection Agency (EPA) requires vehicle manufacturers to install on-board diagnostics (OBD) for emission control on automobiles and light-duty trucks. On-board diagnostic systems, such as computers, microcontrollers, and sensors, monitor emission control systems of a vehicle to detect any malfunction or deterioration that causes emissions to exceed EPA-mandated thresholds. All information monitored or calculated by OBD systems is made available through a standardized, serial 16-cavity connector referred to as an Assembly Line Diagnostic Link (ALDL) or an OBD connector, referred to as an OBD-II connector for vehicles made after 1996. When emission thresholds are exceeded, diagnostic information characterized by OBD systems must be stored in a central computer of the vehicle for use during diagnosis and repair. During vehicle servicing, data can be accessed by way of external engine-diagnostic equipment, commonly referred to as "scan tools" or "dongles," that connect to the OBD-II connector. Data transferred through the connector to the dongle generally identify a status of the vehicle and whether or not a specific component of the vehicle has malfunctioned. Many modern dongles are capable of wireless communication and thus are capable of uploading data to an external computer, such as a desktop, a tablet, a server, a mobile phone, a personal digital assistant (PDA), a personal communicator, a network router or hub, a wireless access point (AP) or repeater, and the like. Embodiments disclosed herein include systems and methods for a vehicle diagnostic pass-through dongle configured to provide OBD-II data monitoring and interactivity, as well as provide connectivity to other vehicle diagnostic equipment.

FIG. 1 illustrates an exemplary embodiment of a pass-through dongle 100 that is configured to be connected to the OBD-II connector of a vehicle. The dongle 100 includes a rigid body 104 disposed between a female connector 108 and a male connector 112. The rigid body 104 comprises a housing that surrounds internal circuitry configured to receive vehicle status data by way of the OBD-II connector of the vehicle. The body 104 generally comprises a rigid plastic, or other similar material, suitable for protecting the circuitry within the body 104.

Figure 2:
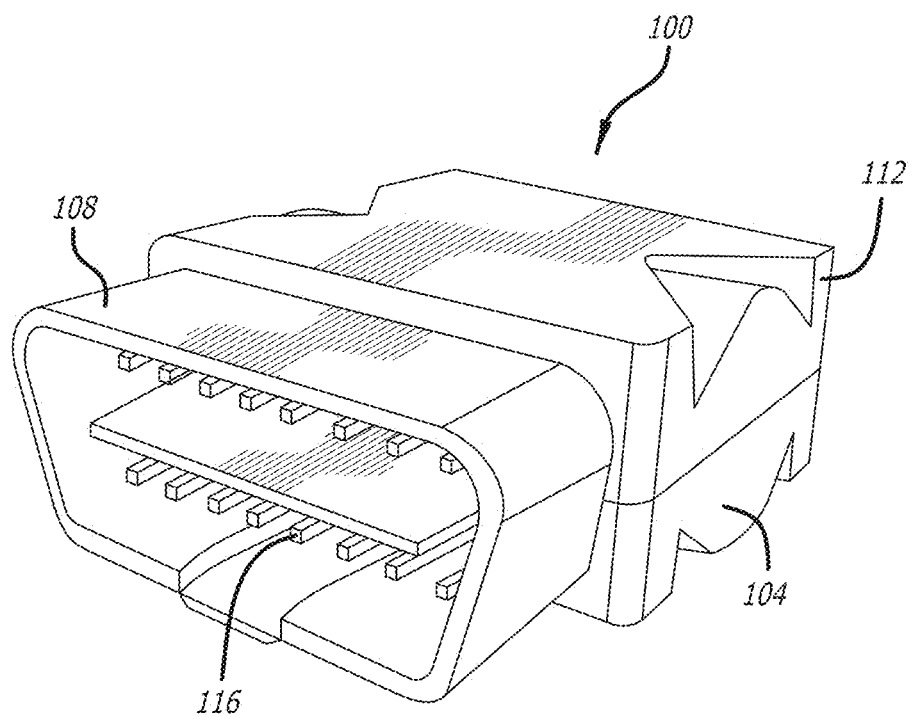
FIG. 2 illustrates an exemplary embodiment of a female connector that includes a multiplicity of male pins suitable for being plugged into the OBD-II connector of the vehicle.

As best shown in FIG. 2, the female connector 108 includes a multiplicity of male pins 116 suitable for being plugged into the OBD-II connector of the vehicle. In the illustrated embodiment, the multiplicity of male pins 116 comprise 16 pins that are arranged to be inserted into a female OBD-II connector of the vehicle. It is contemplated, however, that in some embodiments, the arrangement of the male pins 116 and the number of pins may be altered, without limitation, from the illustrated pin arrangement so as to accommodate different standards of the OBD-II connector that may arise in the future, as well as any variations that may be due to different makes and model of the vehicle. As will be appreciated, the 16 male pins 116 comprising the female connector 108 are in electrical communication with the circuitry inside the body 104, such that vehicle status data may be transmitted from the OBD-II connector of the vehicle to the internal circuitry.

Figure 3:
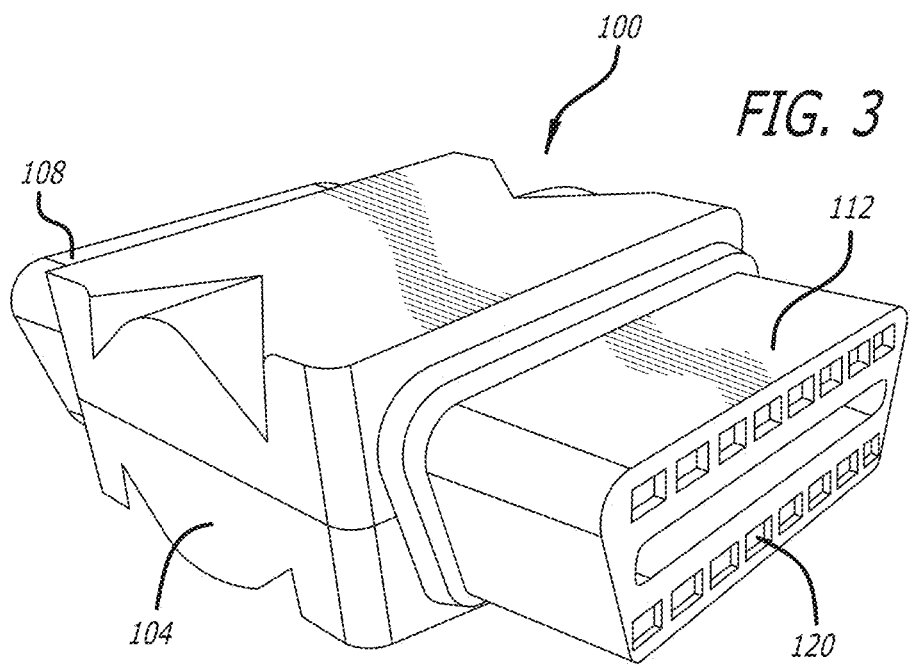
FIG. 3 illustrates an exemplary embodiment of a male connector that includes a multiplicity of female connectors suitable for receiving pins comprising an auxiliary device that is compatible with the OBD-II connector of the vehicle.

Turning to FIG. 3, the male connector 112 includes a multiplicity of female connectors 120 suitable for receiving pins comprising any of various devices that are compatible with the OBD-II connector of the vehicle. Upon comparing FIGS. 2 and 3 it is straightforward to see that the female connectors 120 comprise 16 connectors that are arranged similarly to the male pins 116 shown in FIG. 2. The 16 female connectors 120 are in electrical communication with the internal circuitry within the body 104, such that electrical signals may be transmitted from the internal circuitry to an auxiliary device by way of the connector 112. As state hereinabove with respect to the male pins 116, it is contemplated that in some embodiments, the arrangement and the number of the female connectors 120 may be altered, without limitation, from the illustrated arrangement so as to accommodate different standards of the OBD-II connector that may arise in the future, as well as any variations that may be due to different makes and model of the vehicle.

In general, the female and male connectors 108, 112 are in electrical communication by way of the male pins 116, the female connectors 120 and the internal circuitry within the body 104. As such, the dongle 100 may be plugged into an OBD-II connector of a vehicle to access vehicle status data and transmit the vehicle status data to an auxiliary device that may be coupled with the male connector 112. Thus, the auxiliary device may access OBD-II vehicle status data by way of the dongle 100. At the same time, the dongle 100 may transmit the vehicle status data to a device or system that is configured to read and display the vehicle status data to an end-user of the dongle 100. It is contemplated that the end-user may comprise vehicle servicing personnel, such as, by way of example, auto mechanics, technicians, vehicle owners, and the like, desiring to access and interact with vehicle status and performance data.

In some embodiments, the dongle 100 may be configured to operate in conjunction with a vehicle diagnostic communication system that includes a vehicle performance system. The vehicle diagnostic communication system may comprise any of a desktop, a tablet, a server, a mobile phone, a personal digital assistant (PDA), a personal communicator, a network router or hub, a wireless access point (AP) or repeater, a set-top box, or a combination thereof, without limitation. In some embodiments, the vehicle performance system may be stored on a non-transient machine-readable medium (i.e., a memory) of an application server system which comprises at least one processor and has connectivity to the dongle 100 that is connected to the OBD-II connector of a vehicle. Details pertaining to systems and methods for a vehicle diagnostic communication system configured to present OBD-II data monitoring and interactivity are disclosed in U.S. patent application, entitled "Vehicle Performance Wireless Interface," filed on Jun. 27, 2019 and having application Ser. No. 16/455,422, which claims the benefit of and priority to a U.S. Provisional application filed on Jun. 29, 2018 and having application Ser. No. 62/692,566, the entirety of both of said applications being incorporated herein by reference.

Figure 4:
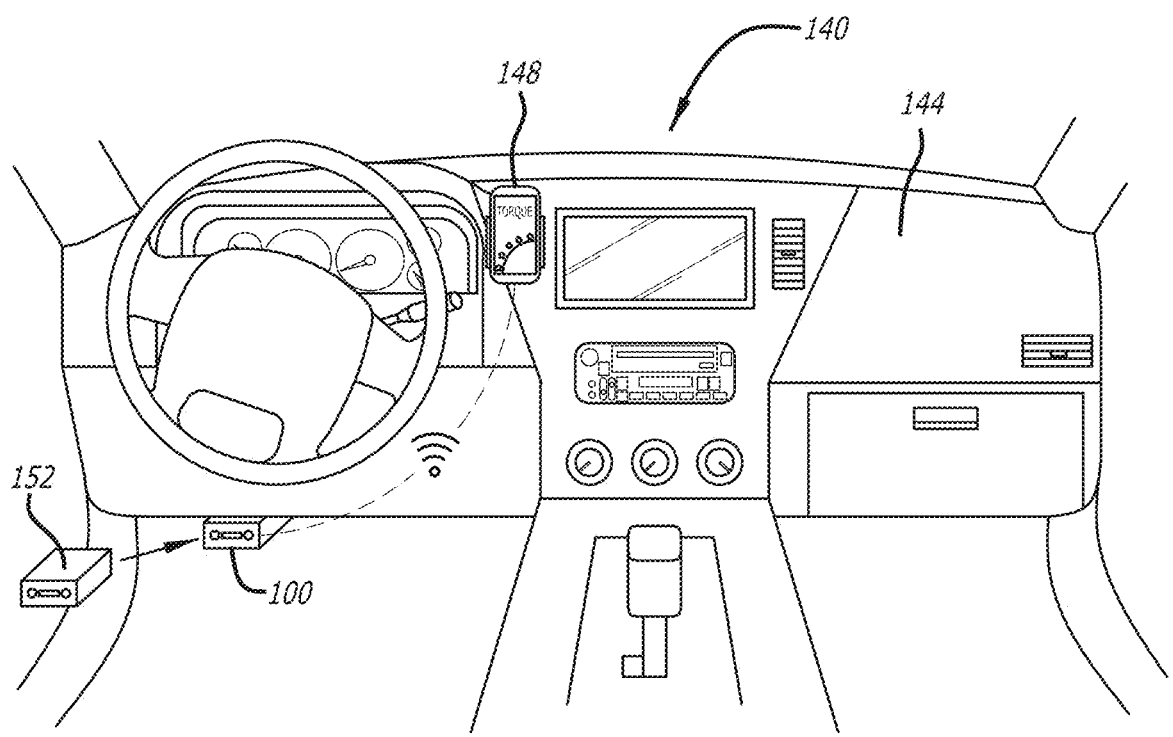
FIG. 4 illustrates an exemplary use environment wherein a wireless connection is established between a wireless pass-through dongle connected to an OBD-II connector of a vehicle and a mobile device.

In some embodiments, the dongle 100 comprises a wireless scan tool configured to provide performance and status data regarding the vehicle to the vehicle performance system. For example, FIG. 4 illustrates an exemplary-use environment 140 wherein an end-user connects the dongle 100 to the OBD-II connector of a vehicle 144 and a wireless connection is established between the dongle 100 and a mobile device, such as a cellphone 148. It is contemplated that the wireless connection between the dongle 100 and the cellphone 148 may comprise any wireless protocol suitable for transferring data, including any of Bluetooth, WiFi, NFC, and the like, without limitation.

Moreover, it is contemplated that the vehicle status data accessed by way of the dongle 100 may comprise any of engine RPM, vehicle speed, coolant temperature, air flow, manifold pressure, barometric pressure, ambient air temperature, boost pressure, wideband AFR, throttle position, spark advance, horsepower and torque calculations, fuel economy (MPG, L/100 km, L/km, etc.), and any other generic OBD-II PIDs that are available, without limitation.

In some embodiments, the vehicle status data provided by way of the dongle 100 further includes degrees of engine knock, transmission fluid temperature and line pressure, slip across torque converter, torque converter lockup state, current transmission gear, rear differential temperature, charge pressure and/or throttle inlet pressure, secondary intake air pressure (post turbo/supercharger), wastegate duty cycle percentage, cylinder misfire data, cylinder head temperature, engine oil pressure, engine oil temperature, clutch pedal position, and data received from any other sensor on the vehicle, as well as any other manufacturer proprietary/enhanced PIDs that may be accessible.

With continuing reference to FIG. 4, once the dongle 100 is plugged into the OBD-II connector of the vehicle 144 to access vehicle status data, an auxiliary device 152 may be coupled with the male connector 112 of the dongle 100. The auxiliary device may access OBD-II vehicle status data by way of the dongle 100 while the dongle 100 wirelessly transmits the vehicle status data to the vehicle performance system operating on the cellphone 148. It is contemplated that the auxiliary device 152 may include any device configured to access vehicle status data by way of an OBD-II connection. In some embodiments, however, the auxiliary device 152 may comprise any of a desktop, a tablet, a server, a mobile phone, a personal digital assistant (PDA), a personal communicator, a network router or hub, a wireless access point (AP) or repeater, a set-top box, or a combination thereof, without limitation.

In some embodiments, the vehicle performance system may comprise a mobile device application operating on the cellphone 148, or other suitable device, that provides access to a component systems package whereby the end-user may interact with the vehicle performance and status data provided by way of the dongle 100. In an exemplary embodiment, the vehicle performance system may present a touch screen whereby the end-user may access the component systems package. For example, the touch screen may include several buttons that enable the end-user to select and operate the component systems comprising the package. It is contemplated that the component systems package may include any of various mobile device applications that enable the end-user to interact with the vehicle performance and status data, such as, by way of non-limiting example, a dashboard system, a driver performance system, a diagnostic system, a maintenance tracking and notification system, a routing system, and the like. Further details pertaining to various systems that may comprise the component systems package are disclosed in the above-mentioned U.S. patent application, entitled "Vehicle Performance Wireless Interface," which is incorporated herein by reference in its entirety.

Figure 5:
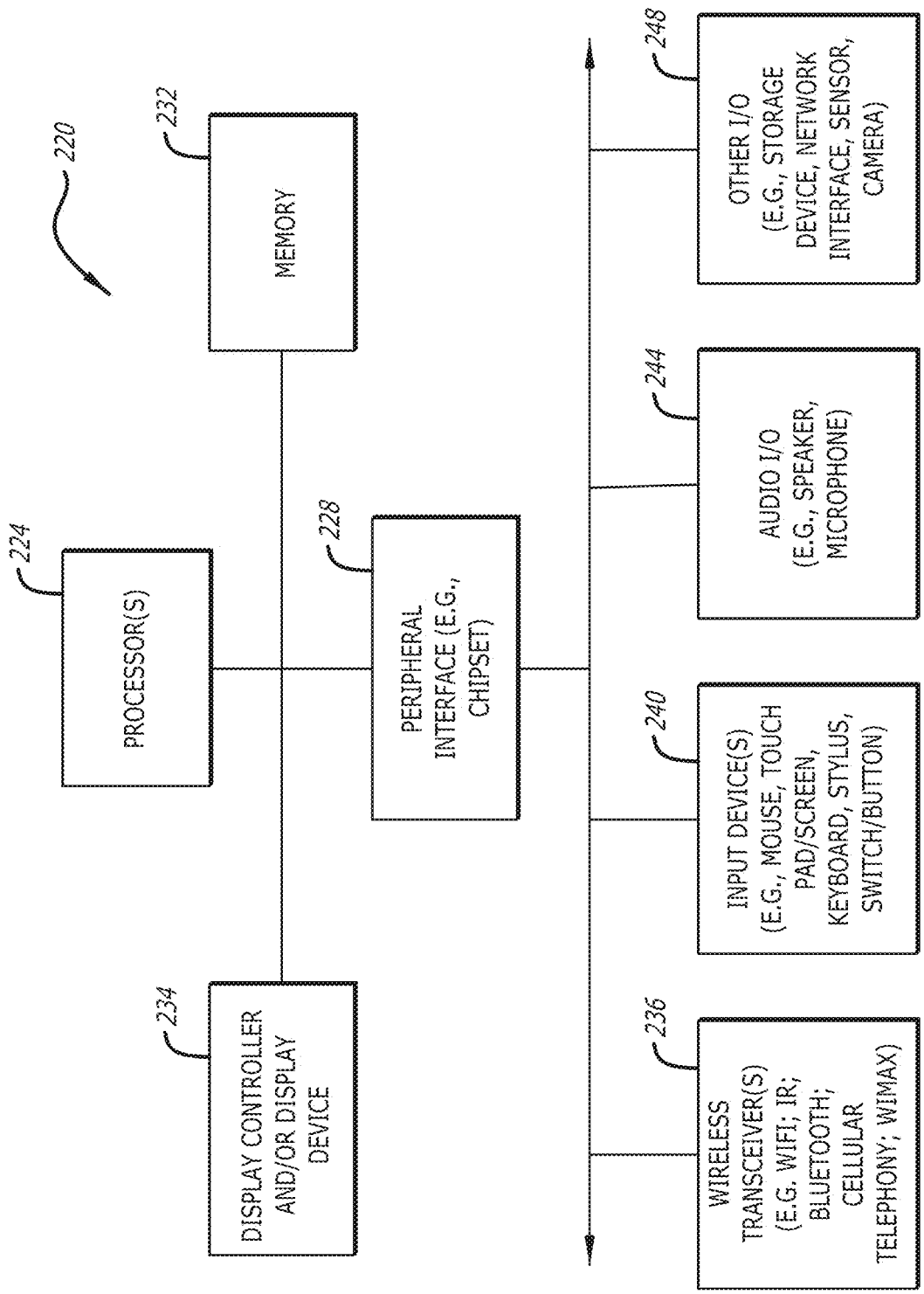
FIG. 5 is a block diagram illustrating an exemplary data processing system that may be used with embodiments of a pass-through dongle according to the present disclosure.

FIG. 5 is a block diagram illustrating an exemplary data processing system 220 that may be used in conjunction with the pass-through dongle 100 to perform any of the processes or methods described herein. System 220 may represent a desktop, a tablet, a server, a mobile phone, a personal digital assistant (PDA), a personal communicator, a network router or hub, a wireless access point (AP) or repeater, a set-top box, or a combination thereof.

In an embodiment, illustrated in FIG. 5, system 220 includes a processor 224 and a peripheral interface 228, also referred to herein as a chipset, to couple various components to the processor 224, including a memory 232 and devices 236-248 via a bus or an interconnect. Processor 224 may represent a single processor or multiple processors with a single processor core or multiple processor cores included therein. Processor 224 may represent one or more general-purpose processors such as a microprocessor, a central processing unit (CPU), or the like. More particularly, processor 224 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 224 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 224 is configured to execute instructions for performing the operations and steps discussed herein.

Peripheral interface 228 may include a memory control hub (MCH) and an input output control hub (ICH). Peripheral interface 228 may include a memory controller (not shown) that communicates with a memory 232. The peripheral interface 228 may also include a graphics interface that communicates with graphics subsystem 234, which may include a display controller and/or a display device. The peripheral interface 228 may communicate with the graphics device 234 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 224. In such a configuration, the peripheral interface 228 operates as an interface chip performing some functions of the MCH and ICH. Furthermore, a graphics accelerator may be integrated within the MCH or the processor 224.

Memory 232 may include one or more volatile storage (or memory) devices, such as random access memory (RAM), dynamic RAM (DRAM), synchronous DRAM (SDRAM), static RAM (SRAM), or other types of storage devices. Memory 232 may store information including sequences of instructions that are executed by the processor 224, or any other device. For example, executable code and/or data of a variety of operating systems, device drivers, firmware (e.g., input output basic system or BIOS), and/or applications can be loaded in memory 232 and executed by the processor 224. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 228 may provide an interface to IO devices, such as the devices 236-248, including wireless transceiver(s) 236, input device(s) 240, audio IO device(s) 244, and other IO devices 248. Wireless transceiver 236 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 240 may include a mouse, a touch pad, a touch sensitive screen (which may be integrated with display device 234), a pointer device such as a stylus, and/or a keyboard (e.g., physical keyboard or a virtual keyboard displayed as part of a touch sensitive screen). For example, the input device 240 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 244 may include a speaker and/or a microphone to facilitate voice-enabled functions, such as voice recognition, voice replication, digital recording, and/or telephony functions. Other optional devices 248 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 248 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 5 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A dongle for connecting to an OBD-II connector of a vehicle, the dongle comprising:
   a female connector for plugging into the OBD-II connector, wherein the female connector includes a multiplicity of male pins that are in electrical communication with the circuitry such that the vehicle status data may be transmitted from the OBD-II connector to the circuitry;
   a male connector for receiving an auxiliary device whereby the auxiliary device may be connected to the dongle by way of the male connector while simultaneously being connected to a wireless device;
   circuitry for accessing vehicle status data;
   a wireless scan tool configured to provide performance and status data regarding the vehicle;
   a wireless transceiver for wirelessly connecting to a mobile device to provide the mobile device with access to a vehicle performance system and interactivity with vehicle performance and status data;
   a rigid body for housing the circuitry; and
   wherein the dongle is configured to wirelessly access at least one of an engine RPM, vehicle speed, coolant temperature, air flow, manifold pressure, barometric pressure, ambient air temperature, and boost pressure of the vehicle.

2. The dongle of claim 1, wherein the male connector includes a multiplicity of female connectors suitable for receiving pins comprising any of various devices that are compatible with the OBD-II connector of the vehicle.

3. The dongle of claim 2, wherein the multiplicity of female connectors are in electrical communication with the circuitry such that electrical signals may be transmitted from the OBD-II connector of the vehicle to the auxiliary device.

4. The dongle of claim 1, wherein the dongle is configured to be plugged into the OBD-II connector to access vehicle status data and pass the vehicle status data to the auxiliary device by way of the male connector.

5. The dongle of claim 4, wherein the dongle is configured to wirelessly transmit the vehicle status data to a device or system that is configured to read and display the vehicle status data to an end-user of the dongle.

6. The dongle of claim 1, wherein the dongle is configured to operate in conjunction with a vehicle diagnostic communication system that includes a vehicle performance system.

7. The dongle of claim 6, wherein the vehicle performance system comprises a mobile device application operating on a mobile device.

8. The dongle of claim 7, wherein the dongle is configured to plug into the OBD-II connector and establish a wireless connection with the mobile device whereby the vehicle performance system provides access and interactivity to vehicle performance and status data.

9. The dongle of claim 8, wherein the dongle is configured to provide the auxiliary device with access to the vehicle performance and status data.

10. The dongle of claim 8, wherein the auxiliary device comprises any device configured to access vehicle status data by way of an OBD-II connection.

11. The dongle of claim 10, wherein the dongle is configured to simultaneously establish the wireless connection with the mobile device and provide the auxiliary device with access to the vehicle performance and status data.

12. A method for accessing vehicle status data, comprising:
    plugging a first connector of a pass-through dongle into an OBD-II connector of a vehicle;
    establishing a wireless connection between the pass-through dongle and a mobile device for wirelessly providing the mobile device with access to a vehicle performance system and interactivity with vehicle performance and status data;
    plugging a second connector of the pass-through dongle into an auxiliary device; and
    wherein the dongle is configured to wirelessly access at least one of an engine RPM, vehicle speed, coolant temperature, air flow, manifold pressure, barometric pressure, ambient air temperature, and boost pressure of the vehicle.

13. The method of claim 12, wherein establishing the wireless connection includes accessing and interacting with the vehicle status data by way of the mobile device.

14. The method of claim 13, wherein plugging the second connector includes accessing the vehicle status data by way of the auxiliary device.

15. A method for a dongle for accessing vehicle status data, comprising:
    configuring circuitry to receive the vehicle status data;
    housing the circuitry within a rigid body having a first connector and a second connector;
    adapting the first connector to plug into an OBD-II connector of a vehicle;
    configuring the second connector to plug into an auxiliary device;
    providing a wireless scan tool configured to provide performance and status data regarding the vehicle;
    coupling the circuitry with the first connector and the second connector; and
    establishing a connection between an auxiliary device with the dongle by way of the second connector while simultaneously being connected to a wireless device by providing a wireless connection between the dongle and a mobile device wherein the dongle is configured to wirelessly access at least one of an engine RPM, vehicle speed, coolant temperature, air flow, manifold pressure, barometric pressure, ambient air temperature, and boost pressure of the vehicle.

16. The method of claim 15, wherein configuring the circuitry includes configuring the circuitry to operate in conjunction with a vehicle diagnostic communication system that includes a vehicle performance system.

17. The method of claim 16, wherein configuring the circuitry includes configuring the circuitry to establish a wireless connection with a mobile device that provides access to and interactivity with the vehicle performance and status data.

18. The method of claim 17, wherein configuring the second connector includes configuring the circuitry to provide the auxiliary device with access to the vehicle status data.

19. The method of claim 18, wherein coupling the circuitry includes configuring the circuitry to simultaneously establish the wireless connection with the mobile device and provide the auxiliary device with access to the vehicle status data.

* * * * *